United States Patent
Lee

(10) Patent No.: US 10,663,583 B2
(45) Date of Patent: May 26, 2020

(54) PARKING ASSISTANCE SYSTEM OF VEHICLE AND METHOD OF IMPROVING DETECTION PERFORMANCE OF ULTRASONIC SENSOR THEREFOR

(71) Applicant: HYUNDAI MOBIS Co., Ltd, Seoul (KR)

(72) Inventor: Tae Ho Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/367,098

(22) Filed: Mar. 27, 2019

(65) Prior Publication Data

US 2019/0302258 A1 Oct. 3, 2019

(30) Foreign Application Priority Data

Apr. 2, 2018 (KR) ........................ 10-2018-0037886

(51) Int. Cl.
 *G01S 15/931* (2020.01)

(52) U.S. Cl.
 CPC ....... *G01S 15/931* (2013.01); *G01S 2015/932* (2013.01)

(58) Field of Classification Search
 CPC ... G01S 15/931; G01S 2015/932; G01S 7/526
 See application file for complete search history.

(56) References Cited

U.S. PATENT DOCUMENTS

| 4,532,639 A | 7/1985 | Price et al. |
| 2005/0192715 A1 | 9/2005 | Kim |
| 2008/0094193 A1* | 4/2008 | Li ........................ G01S 15/931 340/435 |
| 2010/0214872 A1* | 8/2010 | Schmid .................. G01S 7/527 367/98 |
| 2014/0148992 A1 | 5/2014 | Shaffer et al. |
| 2015/0185319 A1* | 7/2015 | Matsuura ............... G08G 1/167 73/627 |

FOREIGN PATENT DOCUMENTS

| KR | 10-2005-0020601 | 3/2005 |
| KR | 10-2014-0040399 | 4/2014 |
| KR | 10-2017-0089336 | 8/2017 |

* cited by examiner

*Primary Examiner* — Omer S Khan
(74) *Attorney, Agent, or Firm* — H.C. Park & Associates, PLC

(57) ABSTRACT

Provided are a parking assistance system of a vehicle and a method of improving detection performance of an ultrasonic sensor therefor. The parking assistance system includes an ultrasonic sensor configured to sense an object by outputting an ultrasonic wave to a first sensing area and a second sensing area set beyond the first sensing area, a memory configured to store a program for sensing an object on the basis of information sensed by the ultrasonic sensor, and a processor configured to execute the program stored in the memory. When the program is executed, the processor verifies an echo to the ultrasonic sensor on the basis of whether an object has been sensed in the first sensing area or the second sensing area.

12 Claims, 19 Drawing Sheets

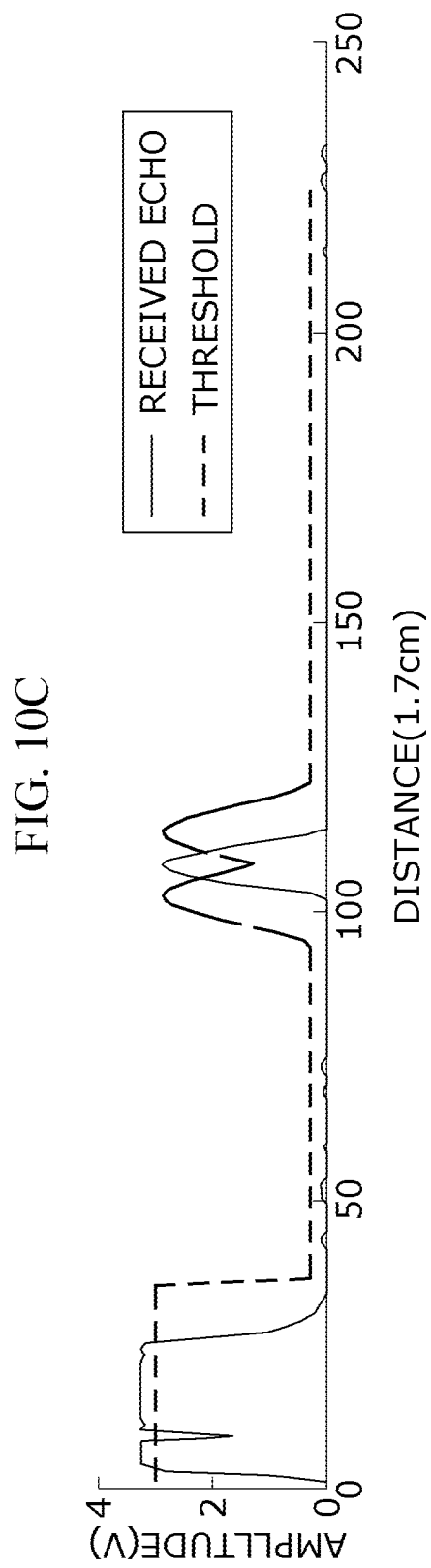

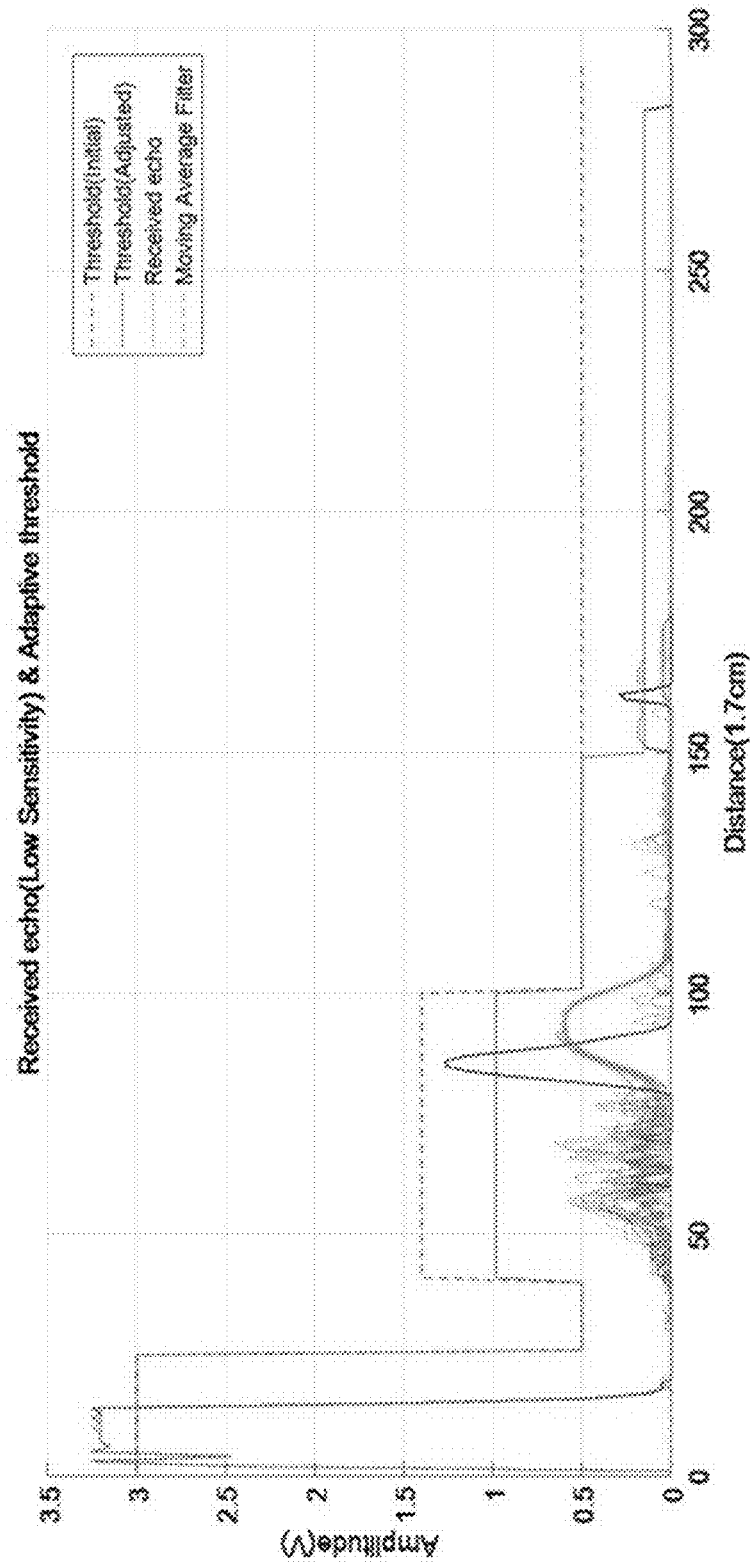

PARKING ASSISTANCE SYSTEM OF VEHICLE AND METHOD OF IMPROVING DETECTION PERFORMANCE OF ULTRASONIC SENSOR THEREFOR

CROSS-REFERENCE TO RELATED APPLICATION

This application claims priority to and the benefit of Korean Patent Application No. 2018-0037886, filed on Apr. 2, 2018, which is hereby incorporated by reference for all purposes as if set forth herein.

BACKGROUND

Field

Exemplary embodiments relate to a parking assistance system of a vehicle and a method of improving detection performance of an ultrasonic sensor therefor.

Discussion of the Background

In the simplest way, a parking assistance system using an ultrasonic sensor determines whether an object is detected on the basis of a threshold value. According to the threshold-based method, an amplitude of received waveform is compared with a threshold value which has been set in the initial stage, and it is determined that there is an object when the amplitude of received waveform exceeds the set threshold value.

In this connection, related arts have attempted improvement in the performance of an ultrasonic sensor by easily controlling the threshold value with a digital module (Korean Unexamined Patent Publication No. 10-2005-0020601), correcting the threshold value according to a temperature (Korean Unexamined Patent Publication No. 10-2014-004039), applying threshold values which are variable over time to respective sensors, and the like.

In the case of the related arts, however, it is difficult to obtain a uniform measured value according to external environments, all kinds of external environment information are required to calculate an accurate threshold value, implementation is complicated, or high cost is required for hardware construction.

The above information disclosed in this Background section is only for enhancement of understanding of the background of the invention and, therefore, it may contain information that does not constitute prior art.

SUMMARY

Exemplary embodiments of the present invention is directed to providing a parking assistance system of a vehicle for enabling long-range sensing by reducing a false alarm rate, which may occur when sensitivity is improved to increase the sensing distance of an ultrasonic sensor, and a method of improving detection performance of the ultrasonic sensor of the parking assistance system thereof.

Objectives of the present invention are not limited to those mentioned above, and other objectives may exist.

According to an aspect of the present invention, there is provided a method of improving detection performance of an ultrasonic sensor for a parking assistance system of a vehicle, the method including: setting an object sensing area based on an ultrasonic wave output from the ultrasonic sensor to a first sensing area starting from the ultrasonic sensor and a second sensing area beyond the first sensing area; and verifying an echo to the ultrasonic sensor on the basis of whether an object has been sensed in the first sensing area or the second sensing area.

The second sensing area may be an area in which diffuse scattering on a ground surface does not occur according to an installation height and a vertical pointing angle of the ultrasonic sensor in the vehicle.

The verifying of the echo to the ultrasonic sensor may include when an ultrasonic wave is output from the first sensing area, compensating a threshold value initially set for the first sensing area, and verifying an echo, which satisfies a condition of the compensated threshold value, to the ultrasonic sensor.

The compensating the threshold value initially set for the first sensing area may include increasing or decreasing the initially set threshold value to be smaller than an amplitude of the echo and greater than an amplitude of a ground wave in one or more of a preset low-temperature range and high-temperature range.

The verifying of the echo, which satisfies a condition of the compensated threshold value, to the ultrasonic sensor may include determining that the echo is a true echo when a width and a peak value of the echo are in a preset range.

The verifying of the echo, which satisfies a condition of the compensated threshold value, to the ultrasonic sensor may include determining that the echo is a true echo when the vehicle is stopped and all of a plurality of echoes of the ultrasonic wave output a plurality of times by the ultrasonic sensor exist within a preset distance.

The verifying of the echo, which satisfies a condition of the compensated threshold value, to the ultrasonic sensor may include measuring a moving distance of an echo of a previously output ultrasonic wave and an echo of a currently output ultrasonic wave when the vehicle is moving, and determining that the echo is a true echo when the moving distance corresponds to a velocity of the vehicle.

The verifying of the echo to the ultrasonic sensor may include, when an object is sensed in the second sensing area, applying an adaptive threshold value set for each section of the second sensing area on the basis of a cell-averaging constant false alarm rate (CA-CFAR) algorithm to verify the echo to the ultrasonic sensor.

The verifying of the echo to the ultrasonic sensor may include setting a minimum level of the adaptive threshold value to prevent the echo from being mistaken for a false echo due to noise according to the adaptive threshold value.

The verifying of the echo to the ultrasonic sensor may include determining that the echo is a true echo when a width and a peak value of the echo are in a preset range.

The verifying of the echo to the ultrasonic sensor may include determining that the echo is a true echo when the vehicle is stopped and all of a plurality of echoes of the ultrasonic wave output a plurality of times by the ultrasonic sensor exist within a preset distance.

The verifying of the echo to the ultrasonic sensor may include measuring a moving distance of an echo of a previously output ultrasonic wave and an echo of a currently output ultrasonic wave when the vehicle is moving, and determining that the echo is a true echo when the moving distance corresponds to a velocity of the vehicle.

According to another aspect of the present invention, there is provided a parking assistance system of a vehicle, the system including: an ultrasonic sensor configured to sense an object by outputting an ultrasonic wave to a first sensing area and a second sensing area set beyond the first sensing area; a memory configured to store a program for sensing an object on the basis of information sensed by the ultrasonic sensor; and a processor configured to execute the program stored in the memory. When the program is executed, the processor verifies an echo to the ultrasonic sensor on the basis of whether an object has been sensed in the first sensing area or the second sensing area.

When an object is sensed in the first sensing area, the processor may compensate a threshold value initially set for the first sensing area and verify an echo, which satisfies a condition of the compensated threshold value, to the ultrasonic sensor.

When an object is sensed in the second sensing area, the processor may apply an adaptive threshold value set for each section of the second sensing area on the basis of a CA-CFAR algorithm and verify an echo to the ultrasonic sensor.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

FIG. 10A to FIG. 10E are set of graphs showing results of applying a cell-averaging constant false alarm rate (CA-CFAR) logic through one measurement operation; and FIG. 11A and FIG. 11B are set of graphs showing measurement results and threshold value compensation results of both a short-range sensing area and a long-range sensing area.

DETAILED DESCRIPTION OF THE ILLUSTRATED EMBODIMENTS

Figure 1:
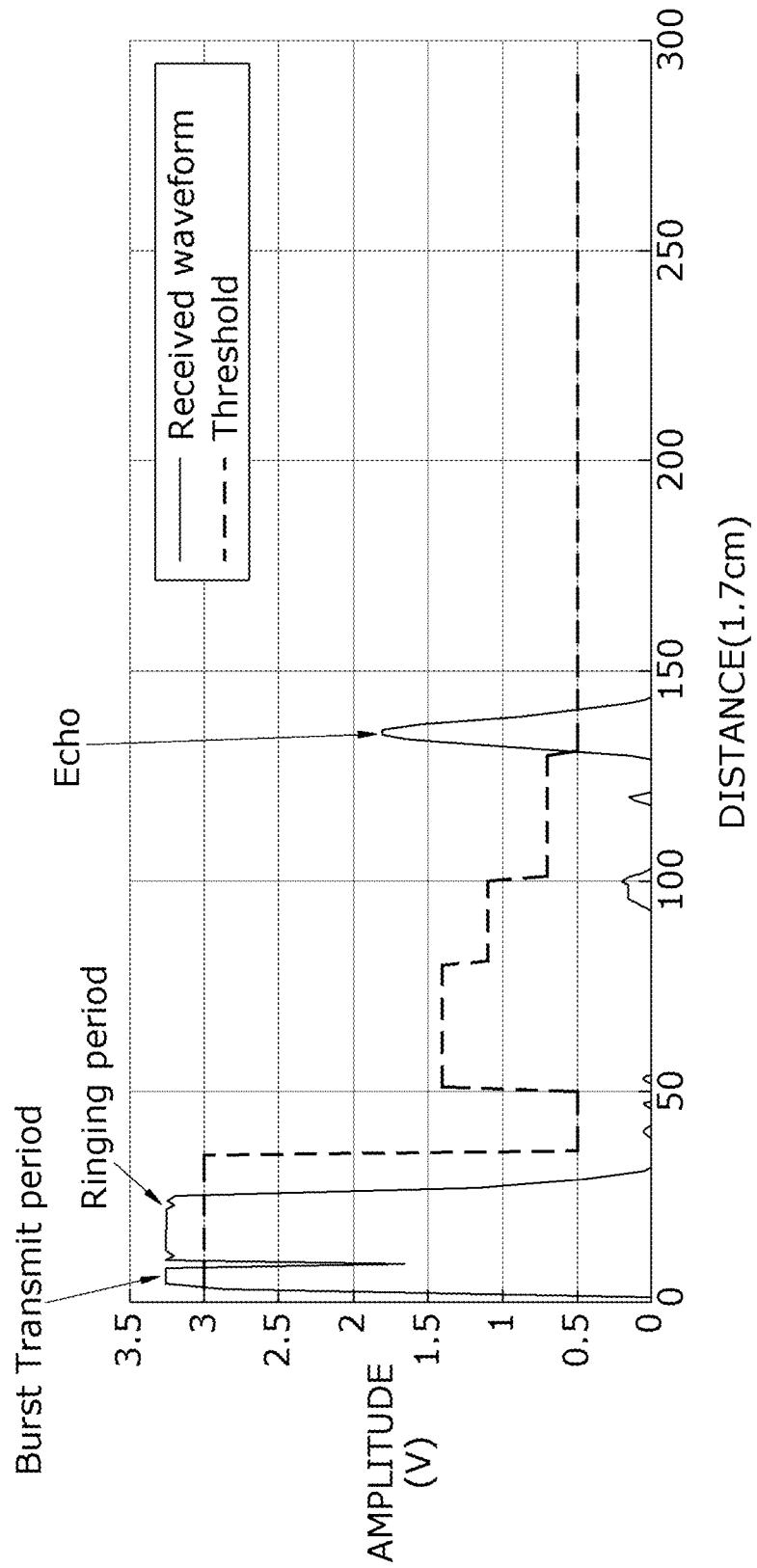
FIG. 1 is a graph showing waveforms measured by a general ultrasonic sensor.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

A method of sensing an object with an ultrasonic sensor and improving accuracy of sensing results includes a method employing a threshold value for object detection, a threshold value compensation method for compensating for a change in an echo caused by changes in ambient environments and sensor characteristics, and an adaptive threshold value method for distinguishing noise and a signal through a received signal comparison.

Assuming that received signals of an ultrasonic sensor are uniform, it is possible to use a method employing a fixed threshold value among methods employing a threshold value. Even echoes of an ultrasonic sensor reflected from the same object may be changed by external environments, such as an ambient temperature and a road surface state. With the method employing a fixed threshold value, it is not possible to cope with such a change in an echo caused by a change in external environments. Also, even when a threshold value control module is installed in a central processing unit (CPU) to facilitate threshold value control, it is difficult to rapidly compensate a threshold value because an ultrasonic sensor senses an object at a very high rate (30 to 40 ms).

The method of compensating a threshold value according to an environmental change is to recognize external environments by a temperature sensor and the like to compensate a threshold value, even though it is not at a high rate. This method has two problems. A first problem is that it is possible to compensate accurately when all of the information of an atmospheric pressure, temperature, and humidity is known. This is because a change in ultrasonic sensitivity caused by environments is determined by four factors, a frequency, atmospheric pressure, temperature, and humidity, and an operating frequency is already known.

In a vehicle, however, only temperature information is provided, and atmospheric pressure and humidity sensors are not provided. Therefore, it is difficult to implement an accurate compensation logic without the corresponding atmospheric pressure and humidity information, and high cost is required to add the corresponding sensors.

A second problem is that it is difficult to calculate a perfect attenuation rate of sensor sensitivity even with all the information. The air which is the medium of an ultrasound is not uniform outside of the vehicle in all sections thereof and varies in temperature according to heights and sections such as the road surface and the atmospheric layer. When there is a temperature difference in the air, the flow of a fluid, that is, the flow of the air, is changed, and thus a waveform which differs from an estimation may be received by an ultrasonic sensor. Therefore, it is impossible to compensate a threshold value by accurately estimating an echo.

A constant false alarm rate (CFAR) method among methods of applying an echo-based adaptive threshold value is a method to distinguish noise and a signal by compiling statistics from echoes which are measured several times. Even when a CFAR algorithm is applied to an ultrasonic sensor as is, there are two problems.

A first problem is that a hardware configuration for the CFAR algorithm is very complicated. Basically, it is necessary to implement the CFAR algorithm by computing the average, the maximum value, or the like of data obtained through several measurements. However, such an implementation method requires a large enough memory and a high-end processor for computation. Since a general ultrasonic sensor is an inexpensive device for sensing an object, it is difficult to install an expensive hardware block for implementing the CFAR algorithm in an ultrasonic sensor.

A second problem is that in the CFAR algorithm, noise and a signal are distinguished by averaging waveforms which are received several times as descried above, but it is not possible to measure an ultrasonic wave several times because the propagation speed is slow due to characteristics of the ultrasonic wave. In other words, when a response is made by measuring a waveform several times and averaging the data, the system response is too slow. For this reason, the CFAR algorithm is applied only to a radar having very high measurement speed and the like.

A parking assistance system 100 according to an exemplary embodiment of the present invention and a method of improving detection performance of an ultrasonic sensor for the parking assistance system 100 may enable long-range sensing by reducing a false alarm rate in a long-range measurement operation while using the existing method employing a threshold value.

Meanwhile, prior to a detailed configuration of the present invention, a principle of an ultrasonic sensor sensing an object, which is applied to the present invention, will be described below.

An ultrasonic sensor transmits an ultrasonic wave through an ultrasonic transducer. When a waveform is reflected from an object and received through the transducer, the distance from the object is measured by calculating a time in which the ultrasonic wave is transmitted to and returns from the object. At this time, a threshold value is used to determine whether there is an object.

Figure 2A:
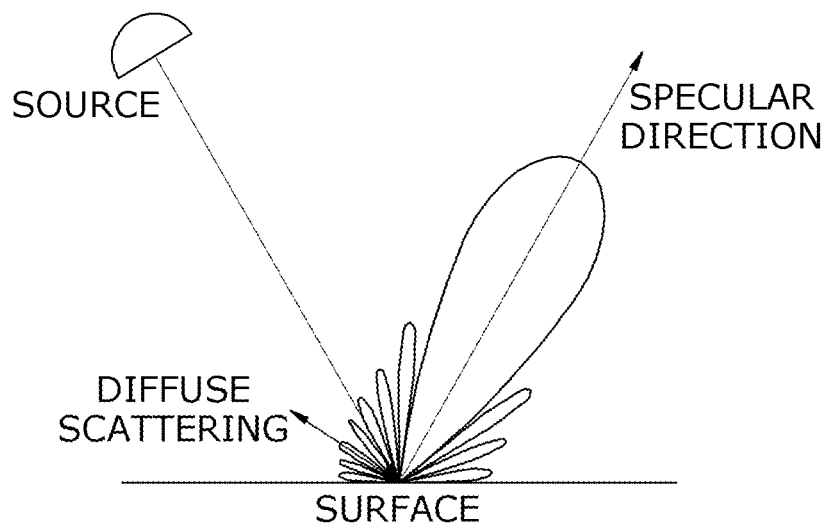
FIG. 2A and FIG. 2B are a set of diagrams illustrating diffuse scattering according to ground surfaces.
Figure 2B:
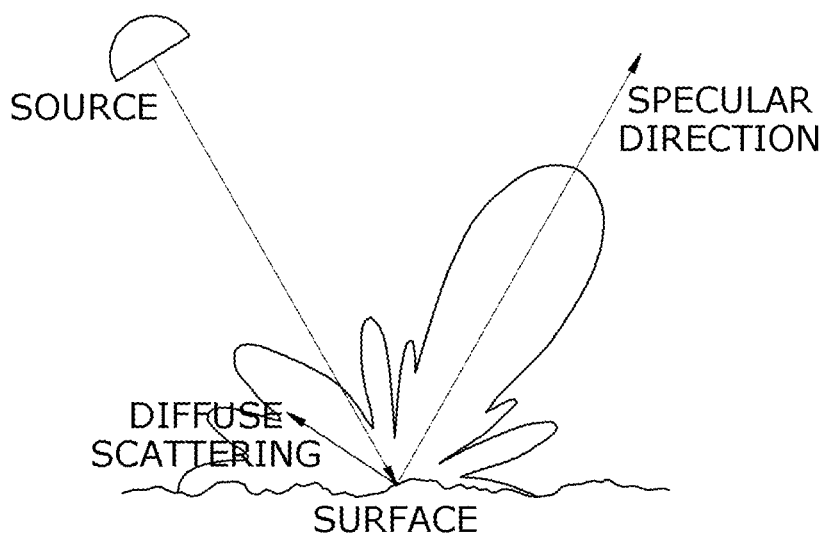

FIG. 1 is a graph showing waveforms measured by a general ultrasonic sensor. In FIG. 1, "Echo" denotes a received wave which has been reflected from an object. FIG. 2A and FIG. 2B are a set of diagrams illustrating diffuse scattering according to ground surfaces. FIG. 2A shows a smooth surface, and FIG. 2B shows a rough surface.

Due to ultrasonic characteristics, diffuse scattering occurs on a rough surface and is a main factor which causes false alarm of an ultrasonic sensor. In other words, in the case of a rough road surface such as an asphalt road or gravel road, diffusely scattered waveforms may be received from the road surface and may cause a false alarm. In this case, it is possible to lessen diffuse scattering by reducing a pointing angle of the ultrasonic sensor, but an object at a low level may not be sensed.

Figure 3:
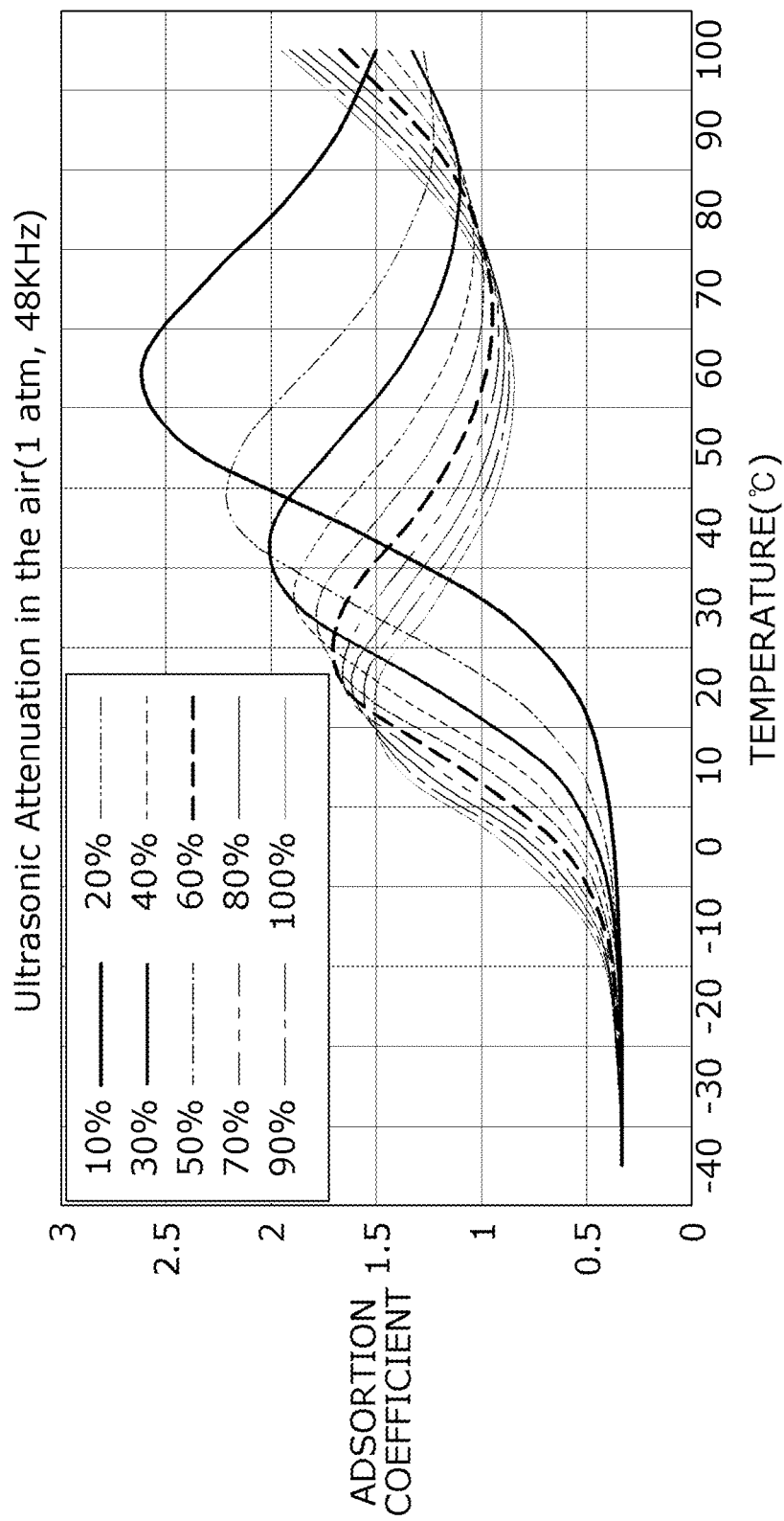
FIG. 3 is a graph showing attenuation curves according to temperature and humidity of an ultrasonic sensor.

FIG. 3 is a graph showing attenuation curves according to temperature and humidity of an ultrasonic sensor.

Since an ultrasonic sensor for a parking assistance system senses an object through the medium of air, an attenuation rate of an ultrasonic signal may vary according to air conditions.

As described above, factors which cause ultrasonic attenuation in the air are a frequency, atmospheric pressure, temperature, and humidity. Assuming that the frequency is a fixed value in an ultrasonic sensor, when the atmospheric pressure is 1 atm, attenuation curves according to temperature and humidity are as shown in FIG. 3.

In general, as shown in FIG. 3, attenuation rates increase with an increase in temperature. Although the attenuation rates differ according to temperature ranges, it is possible to see that the attenuation rates increase with an increase in humidity up to about 50° C.

FIG. 4A to FIG. 4D are set of graphs obtained by accumulating signals which have been diffusely scattered on a ground surface and then received.

Figure 4A:
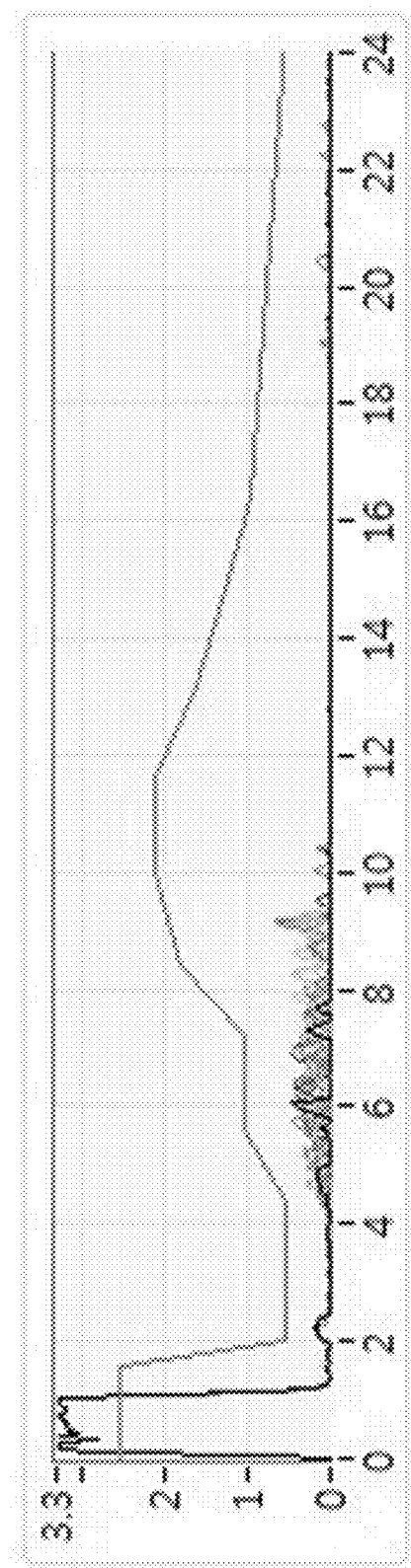
FIG. 4A to FIG. 4D are set of graphs obtained by accumulating signals which have been diffusely scattered on a ground surface and then received.
Figure 4B:
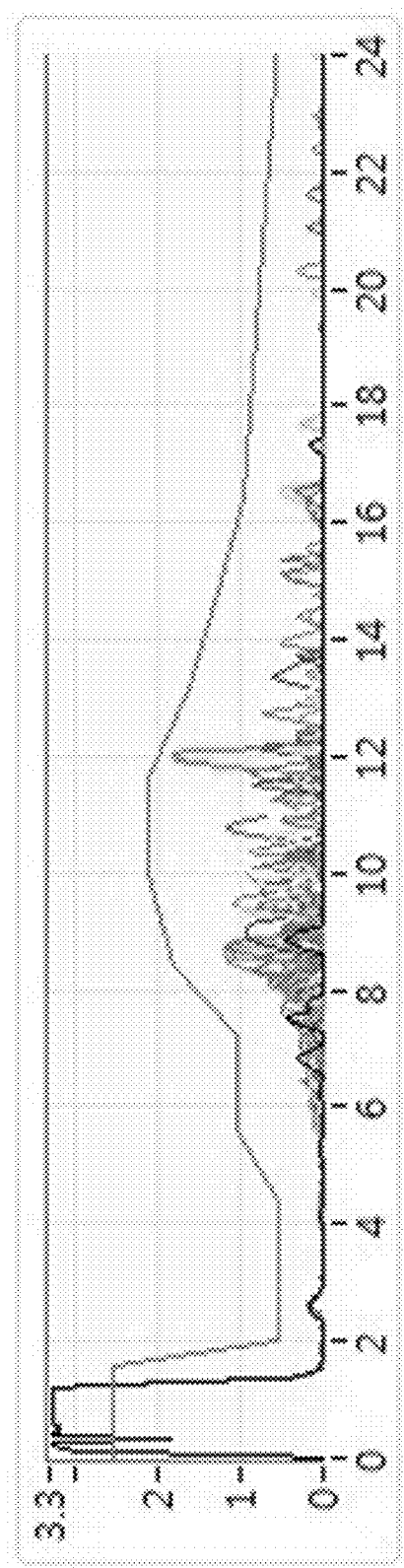

FIG. 4A is a graph obtained by accumulating signals which are diffusely scattered and then received at temperature of 50° C. and humidity of 18%, and FIG. 4B is a graph obtained by accumulating signals at temperature of −20° C. and humidity of 50%. It is possible to see through FIGS. 4A and 4B that a waveform diffusely scattered from a ground surface varies according to atmospheric temperature and humidity even when the same sensor is used at the same installation position.

Figure 4C:
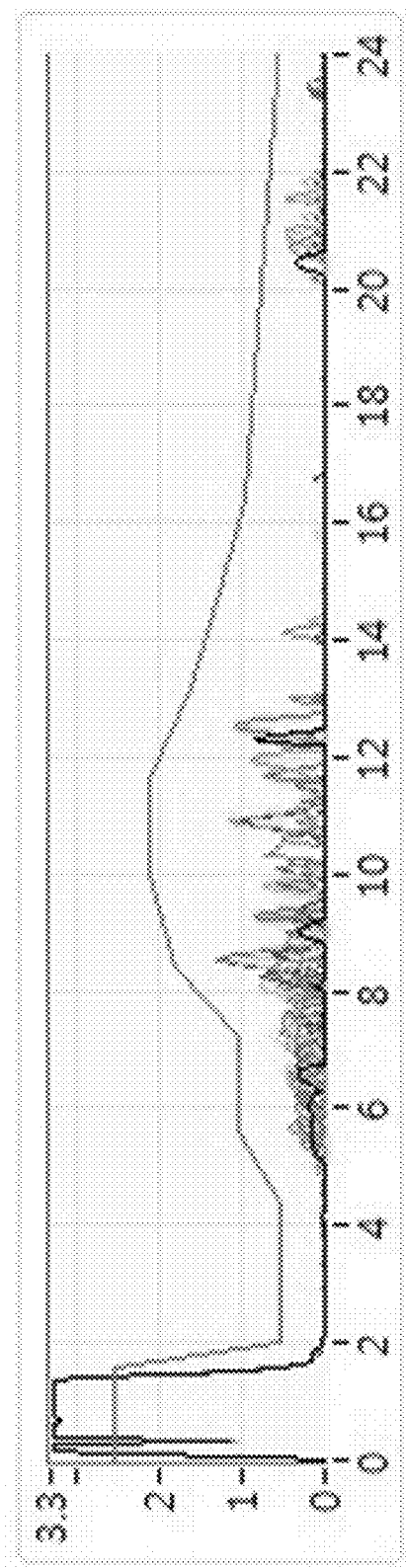
Figure 4D:
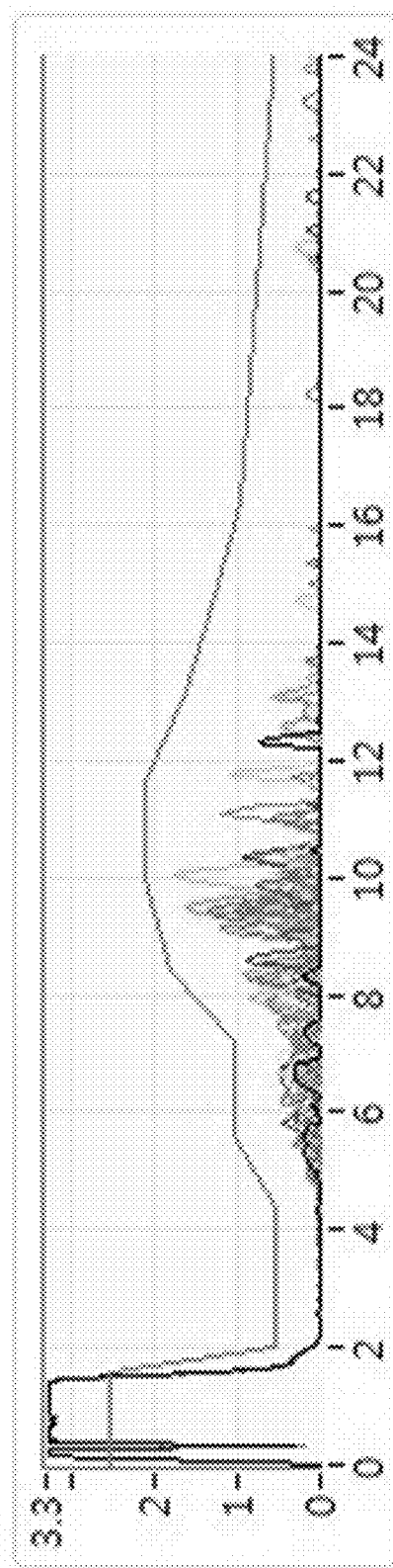

FIG. 4C is a graph obtained by accumulating signals which are diffusely scattered and then received at atmospheric temperature of 13° C. and ground surface temperature of 17° C., and FIG. 4D is a graph obtained by accumulating signals at atmospheric temperature of 10° C. and ground surface temperature of 3° C. It is possible to see through FIGS. 4C and 4D that a received ground wave varies even at the same atmospheric temperature when there is a difference between a ground surface temperature and an atmospheric temperature.

The parking assistance system 100 according to an exemplary embodiment of the present invention will be described below with reference to FIGS. 5 and 6.

Figure 5:
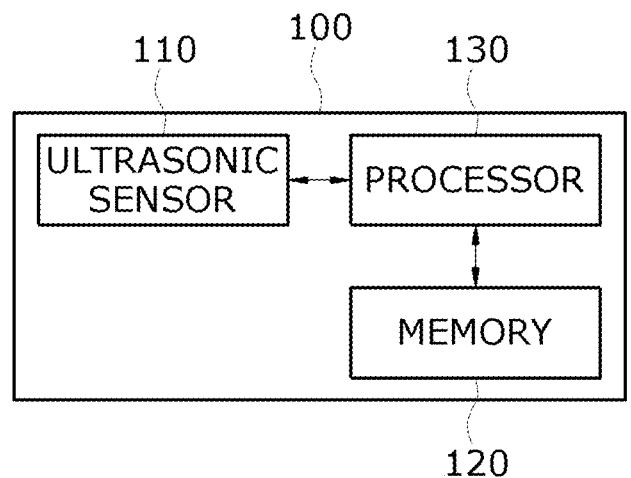
FIG. 5 is a block diagram of a parking assistance system according to an exemplary embodiment of the present invention.

FIG. 5 is a block diagram of the parking assistance system 100 according to an exemplary embodiment of the present invention. FIG. 6 is a diagram illustrating first and second sensing areas.

The parking assistance system 100 according to an exemplary embodiment of the present invention includes an ultrasonic sensor 110, a memory 120, and a processor 130.

The ultrasonic sensor 110 outputs an ultrasonic wave to sense whether there is an object. According to an exemplary embodiment of the present invention, the ultrasonic sensor 110 may divide a sensing area into a first sensing area and a second sensing area, which is set beyond the first sensing area, to sense an object.

Figure 6:
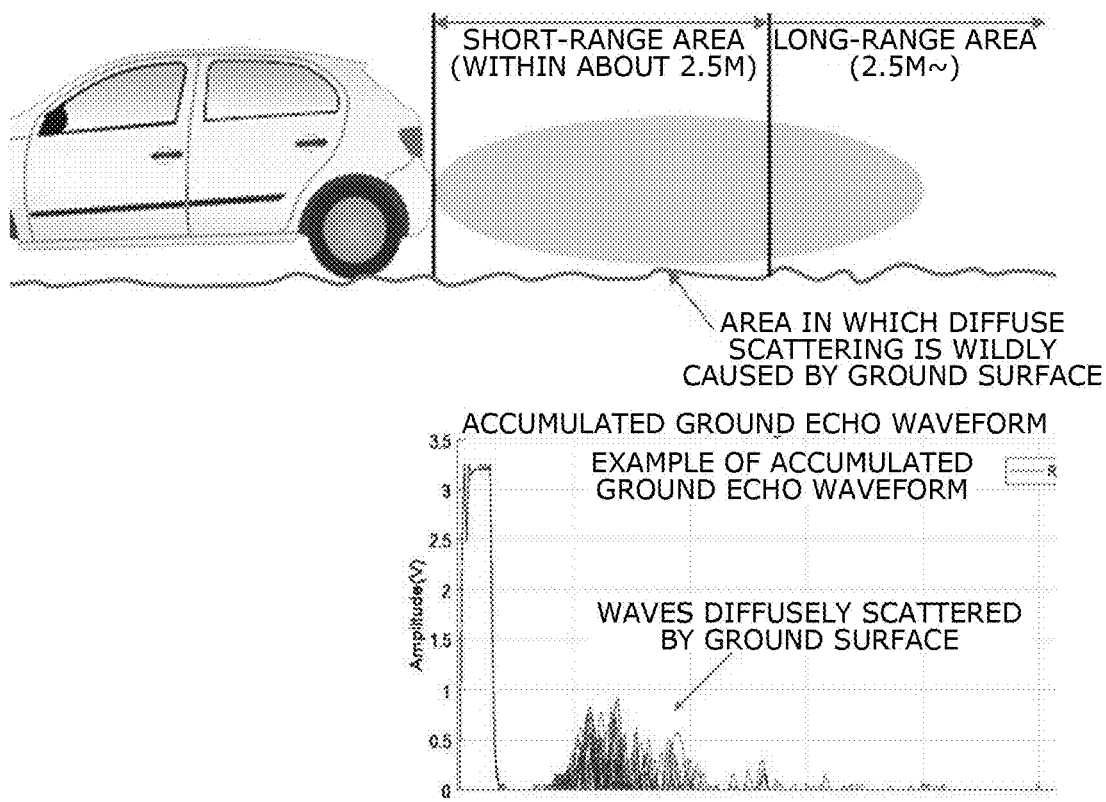
FIG. 6 is a diagram illustrating first and second sensing areas.

As shown in FIG. 6, the first sensing area indicates a short range within about 2.5 m, and the second sensing area indicates a long range beyond 2.5 m.

The first sensing area, which is a short-range sensing area, generally extends up to about 2.5 m, but may vary according to a beam angle and installation position of the ultrasonic sensor 110. In other words, the first sensing area may be set in the parking assistance system 100 by parameterization.

Also, the second sensing area, which is a long-range sensing area, generally indicates a sensing area beyond about 2.5 m, but may vary according to an installation height and a vertical pointing angle of the ultrasonic sensor 110. The second sensing area may be defined as an area in which diffuse scattering does not occur on a ground surface due to the installation height and the vertical pointing angle.

The memory 120 stores a program for sensing an object on the basis of sensed information. The memory 120 is a common designation of a non-volatile storage device, which maintains stored information even when power is not supplied, and a volatile storage device.

For example, the memory 120 may include a NAND flash memory, such as a compact flash (CF) card, a secure digital (SD) card, a memory stick, a solid-state drive (SSD), and a micro SD card, a magnetic computer memory device, such as a hard disk drive (HDD), an optical disk drive, such as a compact disk read-only memory (CD-ROM) and a digital versatile disk (DVD), and the like.

The processor 130 may execute the program stored in the memory 120 and accordingly verify an echo to the ultrasonic sensor 110 on the basis of whether an object is sensed in the first sensing area or the second sensing area.

For reference, the components shown in FIG. 5 according to an exemplary embodiment of the present invention may be implemented in a hardware form, such as a field programmable gate array (FPGA) or an application specific integrated circuit (ASIC), and may perform certain roles.

However, "components" are not limited to software or hardware. Each component may be configured to reside in an addressable storage medium or to execute on one or more processors.

Therefore, examples of components include components, such as software components, object-oriented software components, class components, and task components, processes, functions, attributes, procedures, subroutines, segments of program code, drivers, firmware, microcode, circuitry, data, databases, data structures, tables, arrays, and variables.

Components and functionality provided in the components may be combined into fewer components or subdivided into additional components.

A method of improving detection performance of the ultrasonic sensor 110 which is performed by the parking assistance system 100 according to an exemplary embodiment of the present invention will be described in detail below with reference to FIGS. 7 to 10E.

Figure 7:
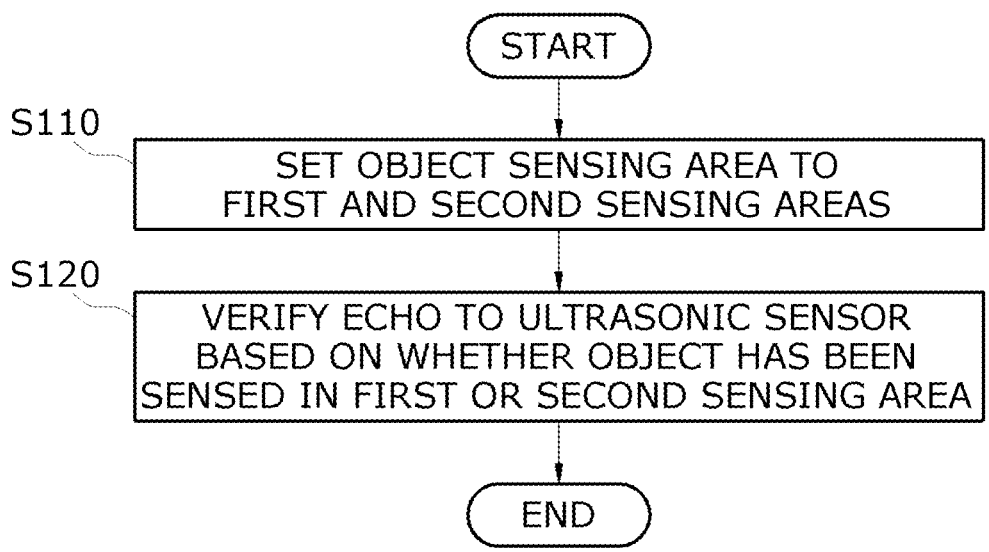
FIG. 7 is a flowchart illustrating a method of improving detection performance of an ultrasonic sensor according to an exemplary embodiment of the present invention.

FIG. 7 is a flowchart illustrating a method of improving detection performance of the ultrasonic sensor 110 according to an exemplary embodiment of the present invention.

The best method of controlling a threshold value is to apply an adaptive threshold value to all areas for sensing an object in every measurement operation. However, as described above, when a response is made by averaging several measured values, the system response is too late due to characteristics of the ultrasonic sensor 110, and a hardware configuration is complicated.

For this reason, according to an exemplary embodiment of the present invention, an object sensing area may be divided into a first sensing area which is a short-range sensing area and a second sensing area which is a long-range sensing area, and an appropriate sensing method may be applied to each area.

Specifically, in the method of improving detection performance of the ultrasonic sensor 110 according to an exemplary embodiment of the present invention, an object sensing area based on an ultrasonic wave output from the ultrasonic sensor 110 may be set to a first sensing area starting from the ultrasonic sensor 110 and a second sensing area beyond the first sensing area (S110).

Next, an echo to the ultrasonic sensor 110 is verified on the basis of whether an object has been sensed in the first sensing area or the second sensing area (S120).

A case in which an ultrasonic wave is output from the first sensing area will be described.

When an ultrasonic wave is output from the first sensing area, a threshold value which has been initially set for the first sensing area is compensated. In other words, the initially set threshold value in one or more of a preset low-temperature range and high-temperature range may be increased or decreased to be smaller than an amplitude of the echo and greater than an amplitude of a ground wave.

Specifically, the initially set threshold value may be used in an exemplary embodiment of the present invention. However, ambient environments such as temperature and humidity are not suddenly changed. Therefore, when the parking assistance system 100 starts or every measurement starts, information on surrounding environments may be received, and the initially set threshold value may be compensated.

According to an exemplary embodiment of the present invention, when a plurality of sensors are installed in a vehicle, it is possible to receive necessary information such as an atmospheric pressure, temperature, and humidity, and when only some sensors are installed, it is possible to acquire only temperature information and compensate the initially set threshold value.

According to performance of the processor 130 included in the parking assistance system 100, a compensation value for the initially set threshold value may be calculated every time, or a pre-calculated value in a look-up table may be used as a compensation value for the initially set threshold value.

For example, when only temperature information is acquired, it is possible to compensate the initially set threshold value using an atmospheric pressure of 1 atm and a local average humidity (about 40%).

In this case, at a low temperature, sound pressure attenuation is not affected by humidity and generally shows a decreasing trend, and thus the threshold value is increased overall. At a high temperature, the threshold value is increased or decreased according to the temperature. At this time, it is assumed that the initial threshold value has been set at room temperature.

Figure 8A:
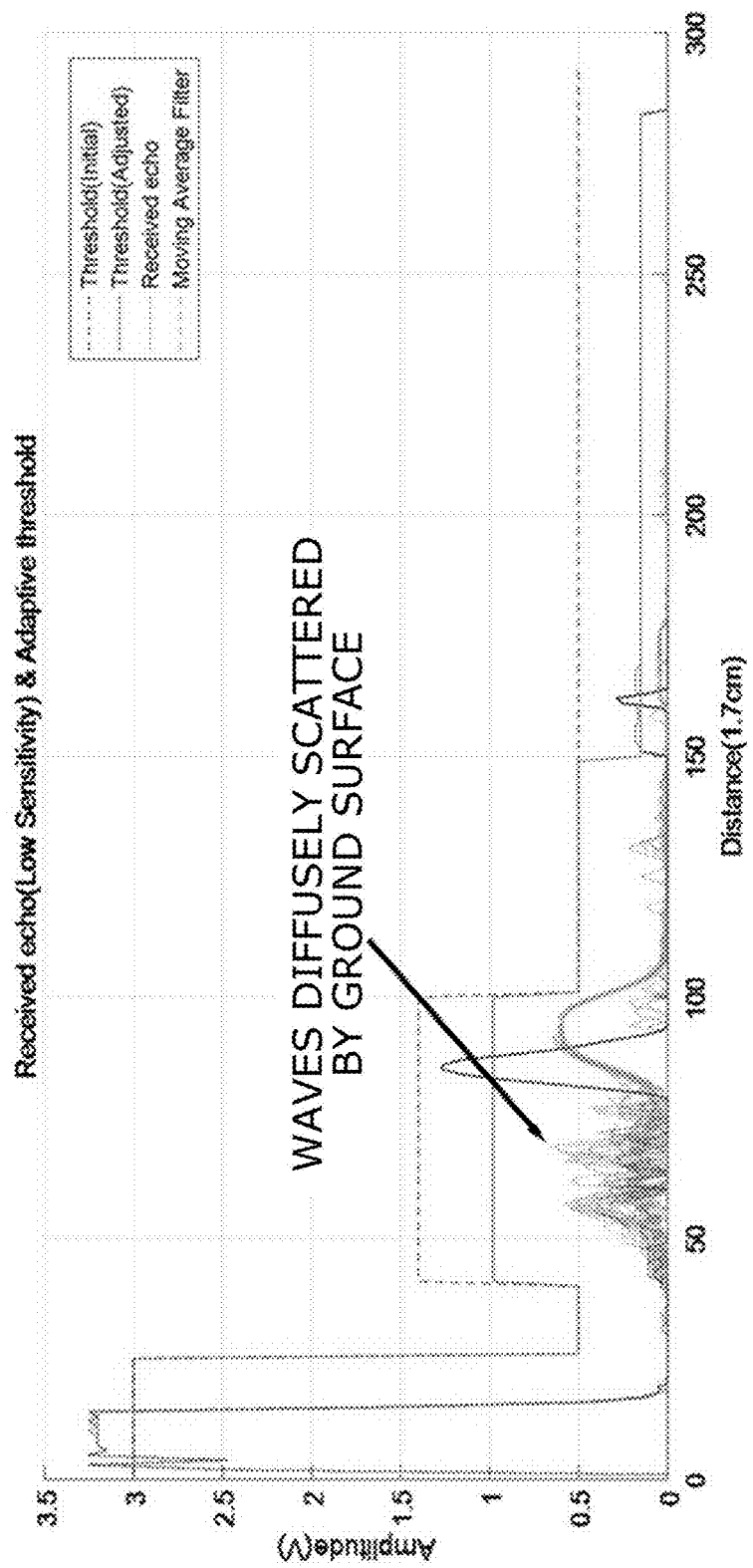
FIG. 8A and FIG. 8B are set of graphs showing threshold value compensation results and received waveforms at high and low temperatures.
Figure 8B:
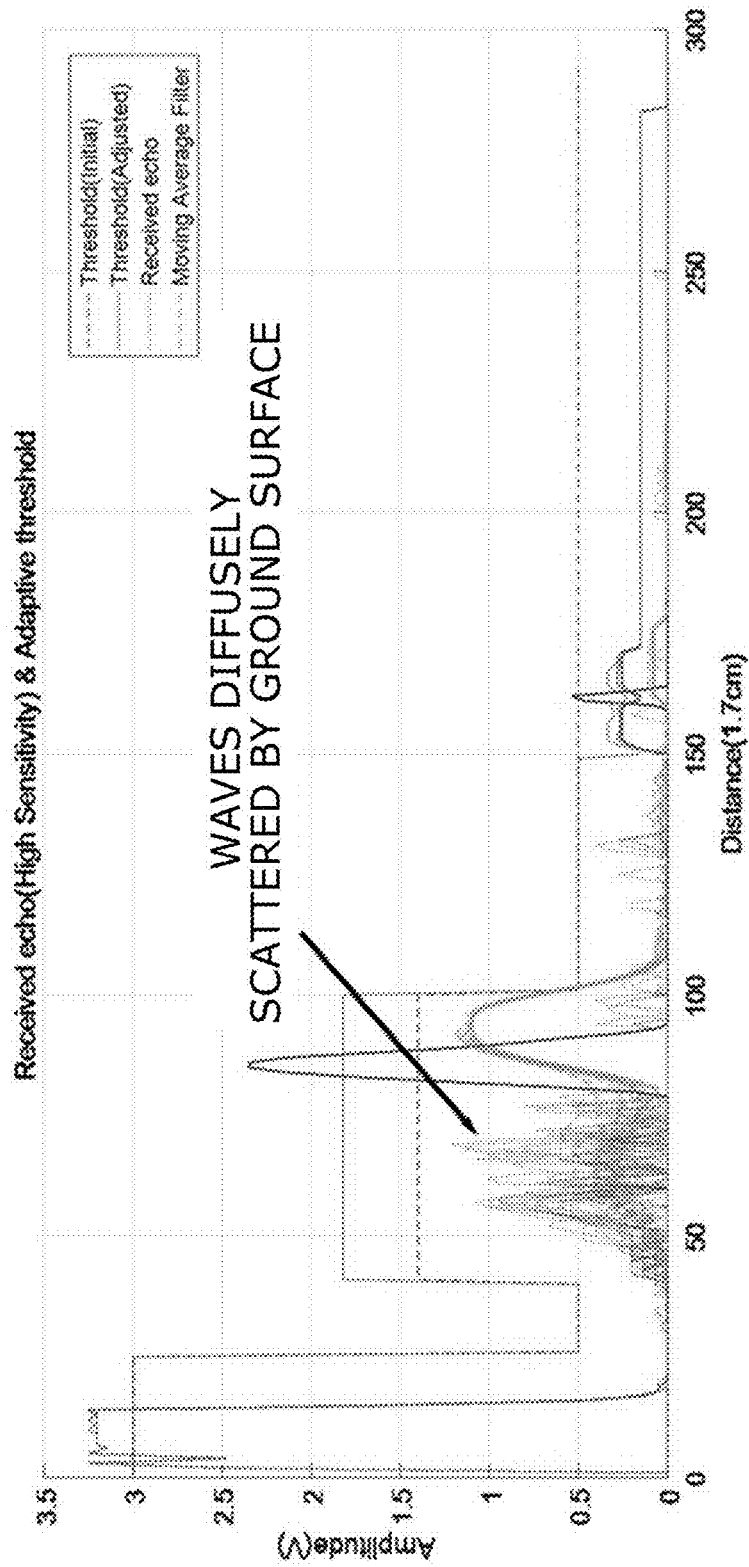

FIG. 8A and FIG. 8B are set of graphs showing threshold value compensation results and received waveforms at high and low temperatures. The broken line indicates an initially set threshold value, and the solid line indicates a threshold value after compensation.

FIG. 8A shows a threshold value compensation result at a high temperature. It is possible to see that amplitudes of waveforms received from a ground surface are reduced at the high temperature but a received echo exceeds a threshold value after compensation.

FIG. 8B shows a threshold value compensation result at a low temperature. Amplitudes of received echoes are increased at the low temperature. Accordingly, amplitudes of ground waves are also increased, and there is a risk of a false alarm. However, it is possible to see that the probability of a false alarm caused by the ground surface is lowered by increasing the threshold value.

Next, a received echo to the ultrasonic sensor 110 which satisfies the condition of the compensated threshold value is verified.

Since it is not possible to accurately estimate a sensitivity change of the ultrasonic sensor 110 caused by ambient environments, it is not possible to prevent a false alarm with only threshold value compensation. Therefore, an exemplary embodiment of the present invention requires a filtering logic for determining, before determining a received echo exceeding the threshold value as a true echo, whether the corresponding signal is actually a true echo.

Figure 9:
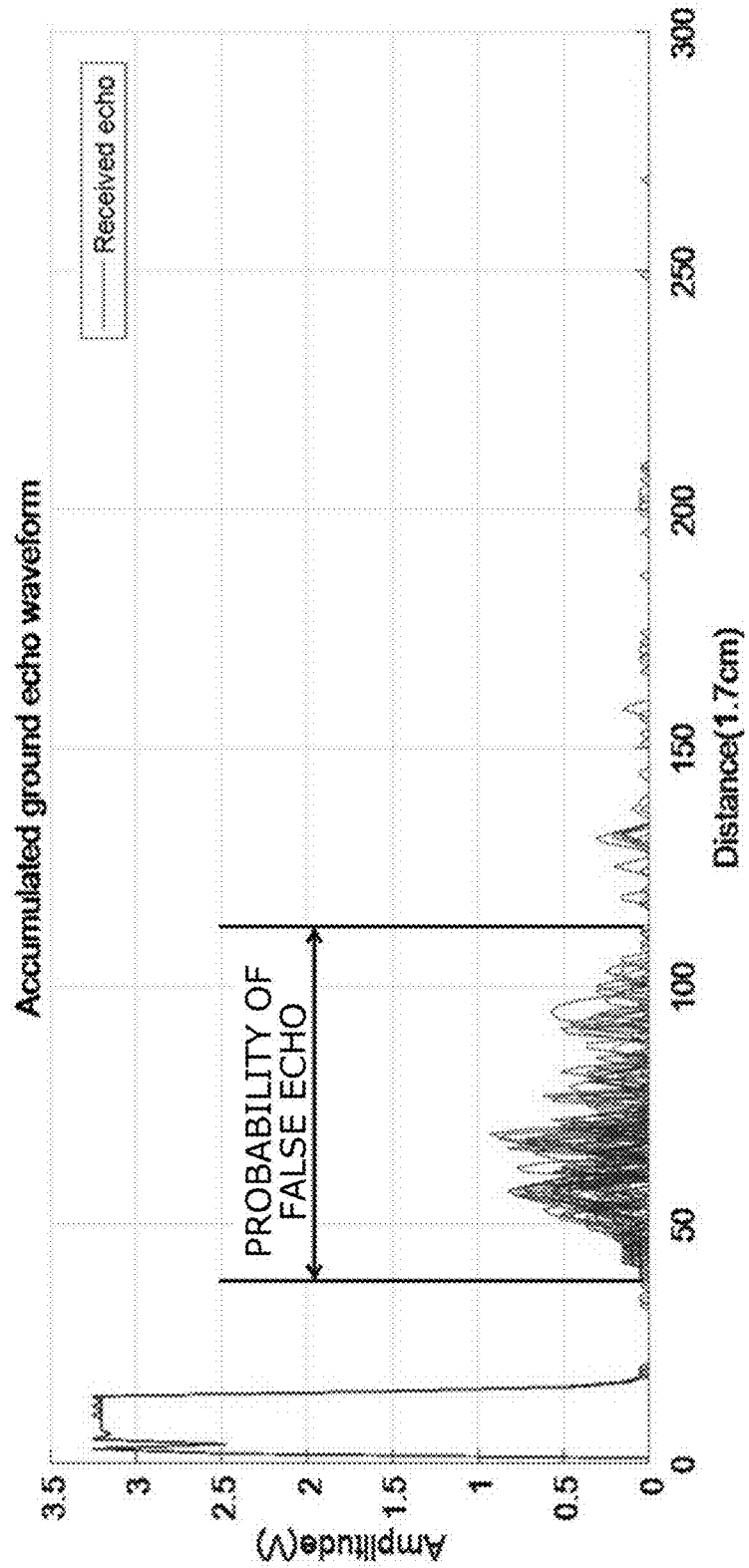
FIG. 9 is a graph showing an example of a sensing angle of an ultrasonic sensor.
Figure 10A:
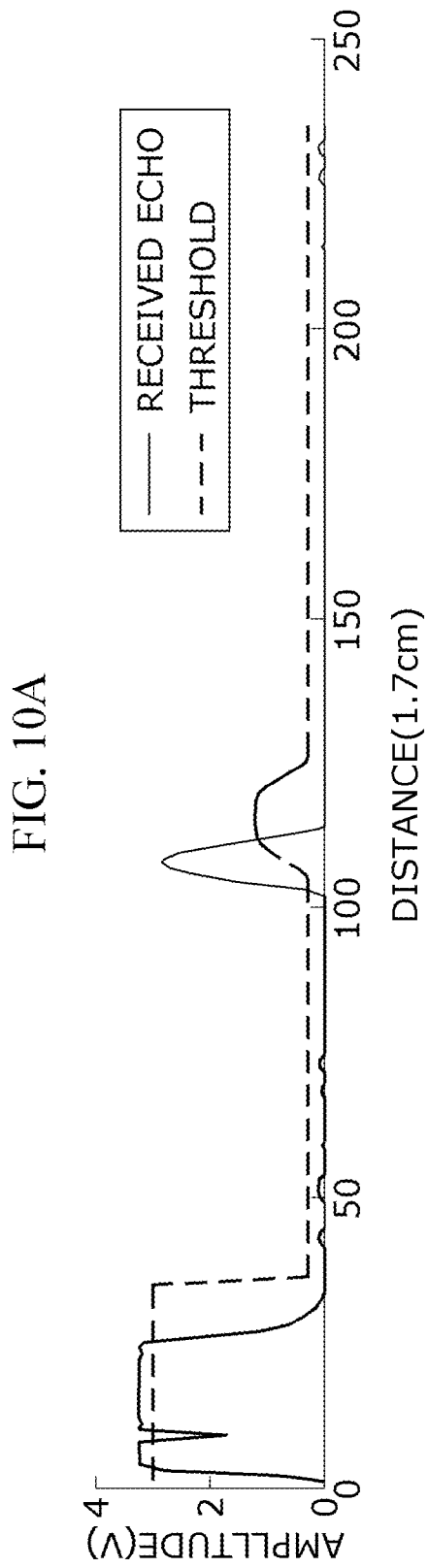
Figure 10B:
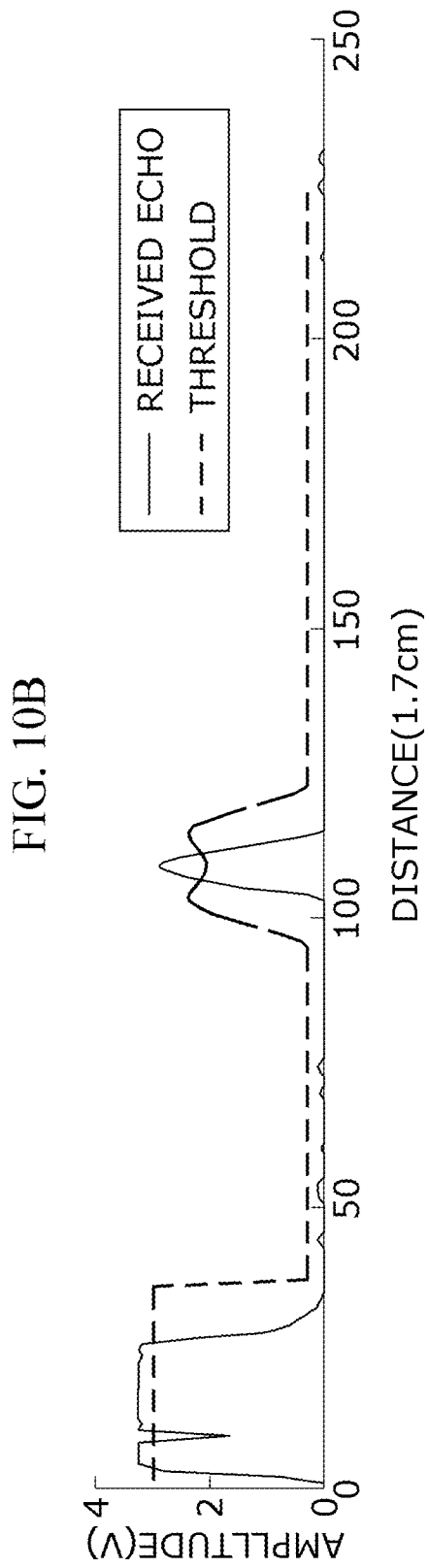
Figure 10D:
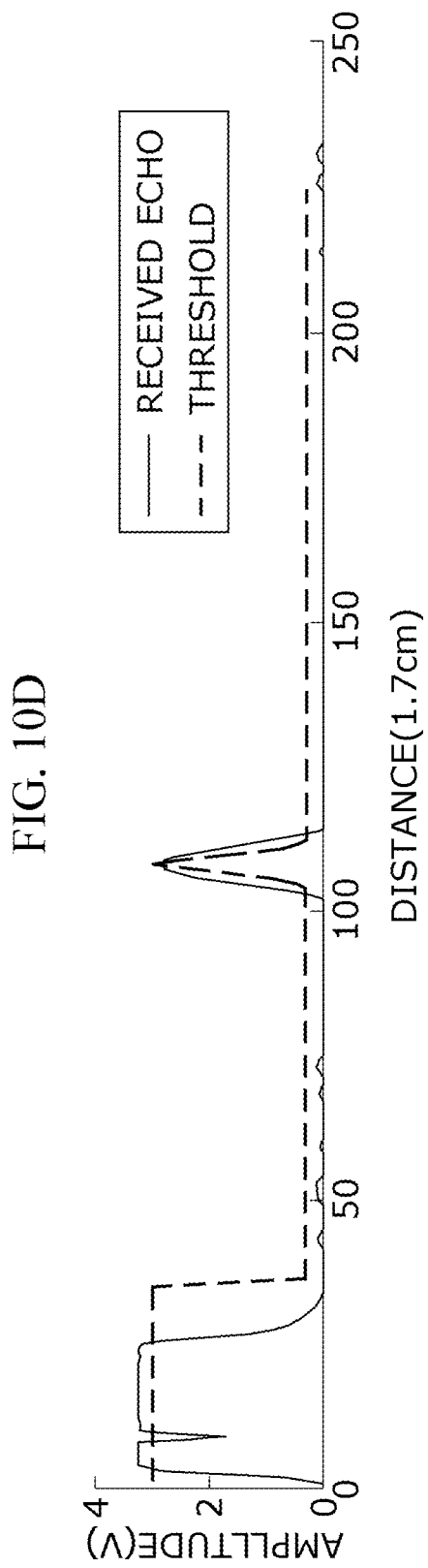
Figure 10E:
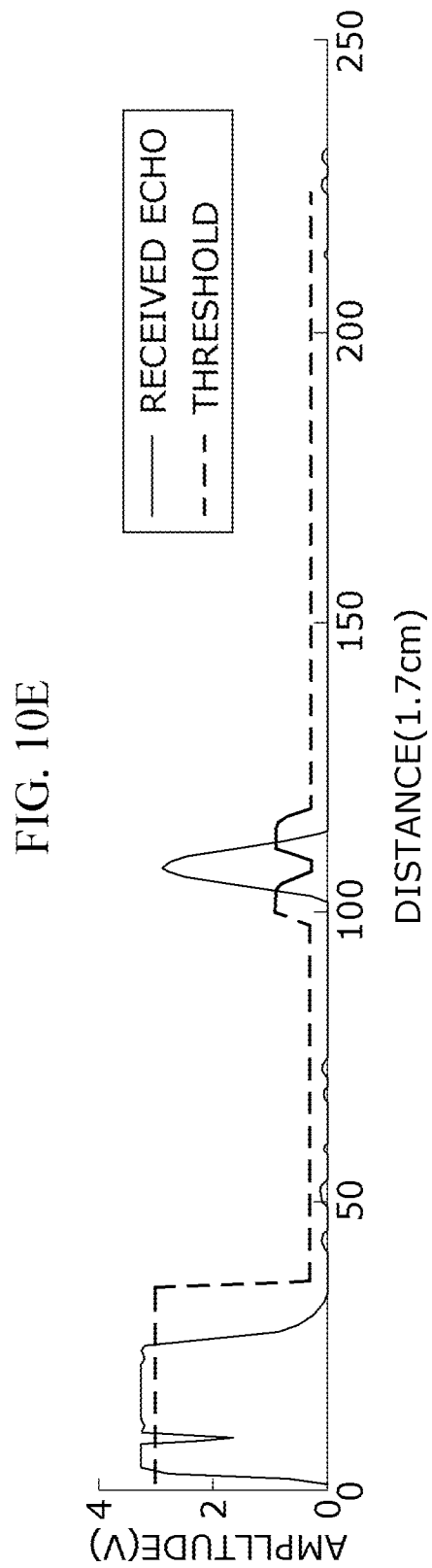

FIG. 9 is a graph showing an example of a sensing angle of the ultrasonic sensor 110.

A diffuse scattering position of a ground wave varies according to the installation position and beam angle of the ultrasonic sensor 110. In other words, diffuse scattering occurs most severely at a point where a vertical sensing angle of the ultrasonic sensor 110 is widened the most as shown in FIG. 9. Accordingly, when the installation position and the vertical beam angle of the ultrasonic sensor 110 are known in advance, it is possible to estimate a point at which a false alarm is caused by diffusion scattering.

According to an exemplary embodiment of the present invention, when an received echo exceeding a threshold value is sensed in a range which is determined to have a high probability of a false alarm, the echo may be determined as a true echo through the following checking process. The checking process may be selectively applied as necessary.

To verify an echo to the ultrasonic sensor 110 according to an exemplary embodiment of the present invention, when a width and a peak value of the echo are in a preset range, the echo may be determined as a true echo.

According to an exemplary embodiment of the present invention, when the corresponding vehicle is stopped and all of a plurality of echoes of an ultrasonic wave output a plurality of times by the ultrasonic sensor 110 exist within a preset distance, the corresponding echo may be determined as a true echo.

According to an exemplary embodiment of the present invention, when the corresponding vehicle is moving, a moving distance may be measured between an echo of a previously output ultrasonic wave and an echo of a currently output ultrasonic wave. When the moving distance corresponds to a velocity of the vehicle, the echo may be determined as a true echo.

A case in which an ultrasonic wave is output from the second sensing area will be described.

The probability of diffuse scattering is remarkably reduced in the second sensing area which is a long-range sensing area. Therefore, when a wave is received, it is possible to determine whether the echo is a true echo through comparison with surrounding waveforms. In other words, when the echo has a greater peak value than surrounding signals, the echo may be determined as a true echo.

In this connection, according to an exemplary embodiment of the present invention, it is possible to verify an echo to the ultrasonic sensor 110 by applying an adaptive threshold value, which is set for each section in the second sensing area.

According to a general CFAR logic, an average is calculated through a plurality of measurements, and noise and a signal are distinguished. However, in a long-range measurement operation employing the ultrasonic sensor 110 according to an exemplary embodiment of the present invention, noise and an echo are clearly distinguished. Therefore, it is possible to effectively detect an echo through only one measurement operation.

Meanwhile, a cell-averaging (CA)-CFAR logic may be used among CFARF logics in an exemplary embodiment of the present invention, and in this case, it is possible to reduce the implementation complexity.

FIG. 10A to FIG. 10E are set of graphs showing results of applying the CA-CFAR logic through one measurement operation.

When there is no noise, it is possible to effectively apply an adaptive threshold value and detect an echo by applying a CFAR logic through only one measurement operation. However, when an adaptive threshold value is applied according to a CFAR logic, the adaptive threshold value may be set to a minimum level so as to prevent sudden noise from being mistaken for a false echo.

Like in the first sensing area, in the second sensing area, it is possible to determine whether an echo is a true echo through a signal processing operation of the echo.

In other words, when a width and a peak value of the echo are in a preset range, the echo in the second sensing area may be determined as a true echo.

When the corresponding vehicle is stopped and all of a plurality of echoes of an ultrasonic wave output a plurality of times by the ultrasonic sensor 110 exist within a preset distance, the echo may be determined as a true echo.

When the corresponding vehicle is moving, a moving distance may be measured between an echo of a previously output ultrasonic wave and an echo of a currently output ultrasonic wave. When the moving distance corresponds to a velocity of the vehicle, the echo may be determined as a true echo.

As described above, even in the second sensing area, a sensed width and peak value of an echo are checked again, and positional movement of the echo according to a vehicle velocity is monitored. Then, the echo may be finally determined as a true echo, and an alarm may be output.

In the above description, operations S110 and S120 may be subdivided into additional operations or combined into fewer operations according to embodiments of the present invention. Also, some operations may be omitted or performed in another sequence as necessary. Although omitted above, descriptions of FIGS. 1 to 6 may also be applied to the method of improving detection performance of an ultrasonic sensor illustrated with reference to FIGS. 7 to 10E.

According to any one of the exemplary embodiments of the present invention, a short-range area and a long-range area may be separated on the basis of parameters such as the installation position and the vertical pointing angle of the ultrasonic sensor 110, and a threshold value may be applied to each of the areas in different ways. When measurement results are transferred to a controller, for example, when five received echoes are transferred as true echoes, measurement may be made efficient by transferring leading four echoes as echoes of the short-range area and transferring the last one echo as an echo of the long-range area.

Figure 11B:
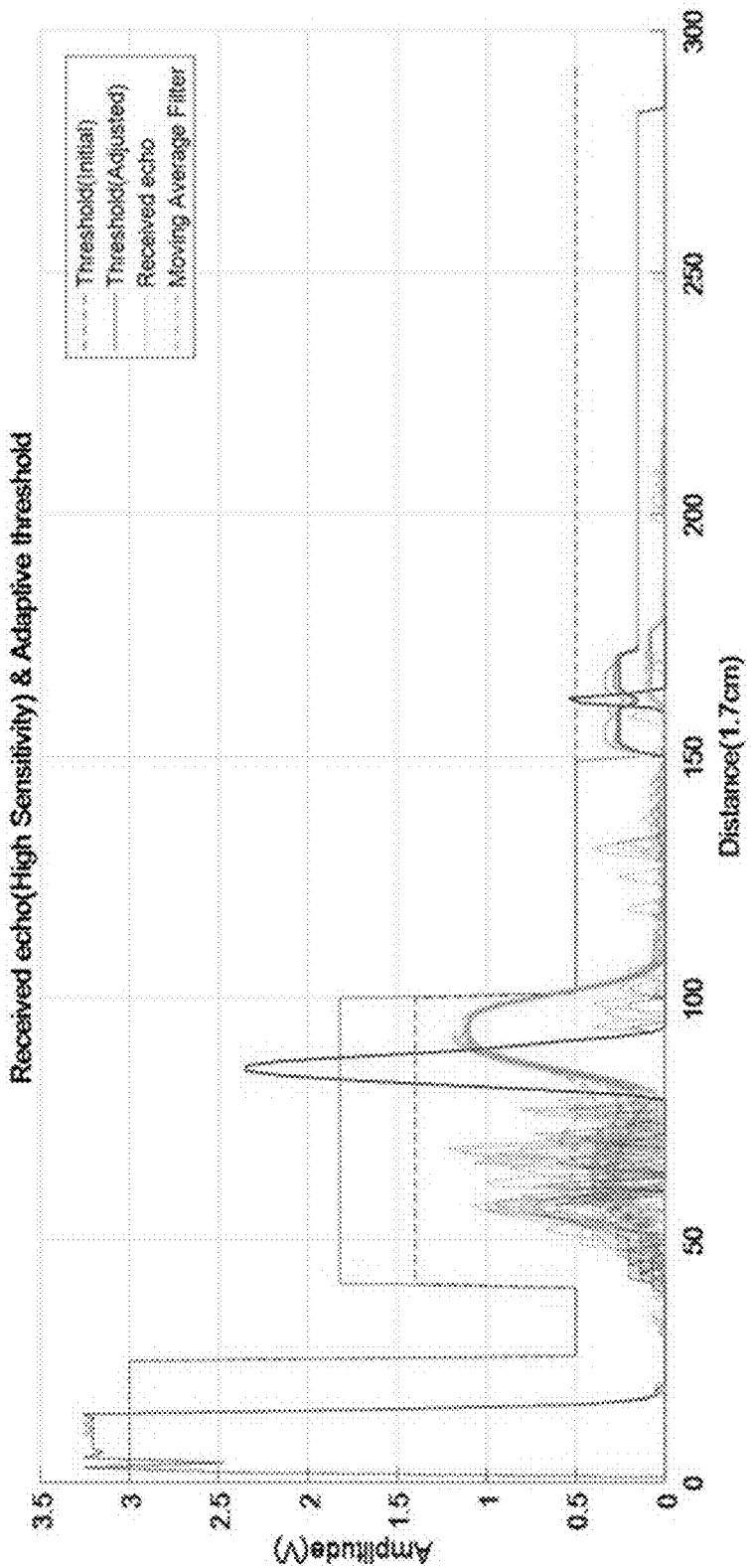

FIG. 11A and FIG. 11B are set of graphs showing measurement results and threshold value compensation results of both a short-range sensing area and a long-range sensing area. The broken line indicates an initially set threshold value, and the solid line indicates a threshold value compensated according to the present invention.

According to an exemplary embodiment of the present invention, it is possible to solve the problem that even when an ultrasonic wave is sensed at a distance of 1.2 m or more, only data corresponding to a distance of 1.2 m or less is usable due to false echoes caused by ambient environments. Therefore, the sensing distance of the ultrasonic sensor 110 may be remarkably increased.

Also, since the algorithm may be implemented using only simple hardware, it is possible to reduce the number of parts, the cost, and the weight of a vehicle.

According to an exemplary embodiment of the present invention, it is possible to remarkably increase a distance of an ultrasonic sensor, and an exemplary embodiment of the present invention may be implemented with only a simple hardware configuration. Therefore, it is possible to reduce complexity and reduce the weight of a vehicle with low cost.

Meanwhile, an exemplary embodiment of the present invention may be implemented in the form of a recording medium including a computer program stored in a medium executed by a computer or instructions that can be executed by a computer. A computer-readable medium may be any available medium that can be accessed by a computer and includes all of volatile and non-volatile media and removable and non-removable media. The computer-readable medium may include both a computer storage medium and a communication medium. The computer storage medium includes all of volatile and non-volatile media and removable and non-removable media implemented with any method or technology, such as computer-readable instructions, data structures, program modules, or other data, for storing information. The communication medium includes computer-readable instructions, data structures, program modules, or other data in a modulated data signal, such as a carrier wave or other transport mechanism, and includes any information delivery medium.

Although the system and method of the present invention have been described in association with specific exemplary embodiments, elements, some operations, or all operations thereof may be implemented using a computer system having general-use hardware architecture.

The foregoing description of the present invention is exemplary, and those of ordinary skill in the technical field of the present invention will appreciate that the present invention can be easily carried out in other detailed forms without departing from the technical spirit or essential characteristics of the present invention. Therefore, it should be noted that the above described embodiments are exemplary in all aspects and are not restrictive. For example, each element described to be a single type can be implemented in a distributed manner. Likewise, elements described to be distributed can be implemented in a combined manner.

The scope of the present invention is defined by the following claims rather than the above detailed description, and the meanings and ranges of the claims and all modifications derived from the concept of equivalents fall within the scope of the present invention.

What is claimed is:

1. A method of improving detection performance of an ultrasonic sensor for a parking assistance system of a vehicle, the method comprising the steps of:
   setting an object sensing area based on an ultrasonic wave output from the ultrasonic sensor to a first sensing area starting from the ultrasonic sensor and a second sensing area beyond the first sensing area; and
   verifying an echo to the ultrasonic sensor based on:
      whether an object has been detected in the first sensing area or the second sensing area, and when an ultrasonic wave is output from the first sensing area, compensating a threshold value initially set for the first sensing area; and
   verifying the echo, which satisfies a condition of the compensated threshold value, to the ultrasonic sensor;
   wherein the step of compensating the threshold value initially set for the first sensing area comprises increasing or decreasing the threshold value initially set for the first sensing area to be smaller than an amplitude of the echo and greater than an amplitude of a ground wave in one or more of a preset low-temperature range and high-temperature range.

2. The method of claim 1, wherein the second sensing area is an area in which diffuse scattering on a ground surface does not occur according to an installation height and a vertical pointing angle of the ultrasonic sensor in the vehicle.

3. The method of claim 1, wherein the step of verifying of the echo, which satisfies a condition of the compensated threshold value, to the ultrasonic sensor comprises the step of determining that the echo is a true echo when a width and a peak value of the echo are in a preset range.

4. The method of claim 1, wherein the step of verifying of the echo, which satisfies a condition of the compensated threshold value, to the ultrasonic sensor comprises the step of determining that the echo is a true echo when the vehicle is stopped and all of a plurality of echoes of the ultrasonic wave output a plurality of times by the ultrasonic sensor exist within a preset distance.

5. The method of claim 1, wherein the step of verifying of the echo, which satisfies a condition of the compensated threshold value, to the ultrasonic sensor comprises measuring a moving distance of an echo of a previously output ultrasonic wave and the echo of a currently output ultrasonic wave when the vehicle is moving, and determining that the echo is a true echo when the moving distance corresponds to a velocity of the vehicle.

6. The method of claim 1, wherein the step of verifying of the echo to the ultrasonic sensor comprises, when an object is sensed in the second sensing area, applying an adaptive threshold value set for each section of the second sensing area based on a cell-averaging constant false alarm rate (CA-CFAR) algorithm to verify the echo to the ultrasonic sensor.

7. The method of claim 6, wherein the step of verifying of the echo to the ultrasonic sensor comprises setting a minimum level of the adaptive threshold value to prevent the echo from being mistaken for a false echo due to noise according to the adaptive threshold value.

8. The method of claim 7, wherein the step of verifying of the echo to the ultrasonic sensor comprises determining that the echo is a true echo when a width and a peak value of the echo are in a preset range.

9. The method of claim 7, wherein the step of verifying of the echo to the ultrasonic sensor comprises determining that the echo is a true echo when the vehicle is stopped and all of a plurality of echoes of the ultrasonic wave output a plurality of times by the ultrasonic sensor exist within a preset distance.

10. The method of claim 7, wherein the verifying of the echo to the ultrasonic sensor comprises measuring a moving distance of an echo of a previously output ultrasonic wave and an echo of a currently output ultrasonic wave when the vehicle is moving, and determining that the echo is a true echo when the moving distance corresponds to a velocity of the vehicle.

11. A parking assistance system of a vehicle comprising:
   an ultrasonic sensor configured to sense an object by outputting an ultrasonic wave to a first sensing area and a second sensing area set beyond the first sensing area;
   a memory configured to store a program for sensing an object based on information sensed by the ultrasonic sensor; and
   a processor configured to execute the program stored in the memory, wherein when the program is executed, the processor is configured to verify an echo to the ultrasonic sensor based on whether an object has been sensed in the first sensing area or in the second sensing area;
   wherein when an object is sensed in the first sensing area, the processor is configured to compensate a threshold value initially set for the first sensing area and verify the echo, which satisfies a condition of the compensated threshold value, to the ultrasonic sensor;
   wherein the compensating the threshold value initially set for the first sensing area increasing or decreasing the threshold value initially set for the first sensing area to be smaller than an amplitude of the echo and greater than an amplitude of a ground wave in one or more of a preset low-temperature range and high-temperature range.

12. The parking assistance system of claim 11, wherein when an object is sensed in the second sensing area, the processor is configured to apply an adaptive threshold value set for each section of the second sensing area based on a cell-averaging constant false alarm rate (CA-CFAR) algorithm and verify an echo to the ultrasonic sensor.

* * * * *